United States Patent [19]

Weaver

[11] Patent Number: 5,031,483

[45] Date of Patent: Jul. 16, 1991

[54] PROCESS FOR THE MANUFACTURE OF LAMINATED TOOLING

[75] Inventor: William R. Weaver, Toledo, Ohio

[73] Assignee: W. R. Weaver Co., Toledo, Ohio

[21] Appl. No.: 417,838

[22] Filed: Oct. 6, 1989

[51] Int. Cl.$^5$ ............................................. B21K 5/20
[52] U.S. Cl. .............................. 76/107.1; 76/DIG. 6; 51/165.71; 364/474.04
[58] Field of Search .................. 76/107.1, DIG. 6; 364/474.04, 474.02, 474.08, 474.22, 474.24, 474.25; 51/165.71

[56] References Cited

U.S. PATENT DOCUMENTS

| | | | |
|---|---|---|---|
| 2,007,301 | 7/1935 | Lemieux | 76/DIG. 6 |
| 2,679,172 | 5/1954 | Clevenger | 76/107.1 |
| 4,575,330 | 3/1986 | Hull | 364/474.24 |
| 4,675,825 | 6/1987 | De Menthon | 364/474.04 |

FOREIGN PATENT DOCUMENTS 0082679  5/1985  Japan ................................ 76/107.1

*Primary Examiner*—Roscoe V. Parker
*Attorney, Agent, or Firm*—Marshall & Melhorn

[57] ABSTRACT

A process for manufacturing tooling, e.g., molds, from individual laminations which when stacked in the proper sequence and bonded together define a forming surface. In producing a mold, cut-outs are made by a 4 or 5-axis cutting means in the individual laminations to provide the shaping surface and optionally passageways adjacent the surface through which a heat transfer medium can be made to circulate. Also, selected ones of the laminations may be spaced in the thickness dimension of the mole to provide communication between the mold cavity and a source of pressurized air or vacuum, or the atmosphere.

20 Claims, 3 Drawing Sheets

PROCESS FOR THE MANUFACTURE OF LAMINATED TOOLING

BACKGROUND OF THE INVENTION

The present invention relates generally to the manufacture of tooling for the glass, plastic, sheet metal stamping and cast metal industries, and more particularly to the manufacture of laminated molds or dies for use therein.

Tools in the form of patterns, core boxes, molds or dies are commonly employed in the manufacturing industry to accurately produce large volumes of identical parts or articles. The manufacturing tool can be a single mold or die or a pair of mold members having complementary shaping surfaces to manufacture articles by compression molding, injection molding, blow molding, casting, vacuum forming and stamping processes, for example.

The tooling is manufactured from both ferrous and non-ferrous metals as well as non-metallic materials, such as ceramics and plastics. The material selected for the tool is very important and determined by a number of factors including the design of the part itself, material chosen for the part, length of the production run and type of equipment and manufacturing process being employed. Toolmaking is a very refined art requiring the precise cutting or machining of the forming surfaces with specialized tools by highly skilled operating personnel. The machining of these surfaces by trained personnel is a very laborious and tedious task and therefore a rather costly operation.

Although this machining is a major factor involved in the high cost of manufacturing precision tools, quite often it is necessary to perform additional operations on the tool which require time and add to the overall cost. In this regard, it is often necessary to provide heating or cooling passageways in the tool, e.g., either one or both of the mold parts, to control the temperature of the same and the parts being processed. This is typically accomplished by boring or drilling straight or intersecting passageways into the body of the mold after the shaping surface is formed and adapting these passageways for connection to a source of heating or cooling fluid. Ideally, the passageways are located a predetermined distance from the walls of the shaping surface to provide the most efficient heating or cooling, as desired. Unfortunately, often this is not attainable with the mold manufacturing processes presently known in the art, especially with respect to curved or irregularly shaped surfaces.

An additional processing step is also required when manufacturing tooling requiring venting, e.g., vacuum molds and foundry core boxes. Typically, the shaping surface of the mold is provided with through apertures which communicate with an enclosed chamber connected to a source of vacuum or pressurized air. These apertures are drilled after the surface is machined and, although not a difficult procedure, it does require additional time depending on the hole size and frequency, adding to the overall cost of the tooling.

In an effort to reduce manufacturing costs, there has been a growing trend in recent years to the use of computers and numerically controlled machine tools to form these surfaces. In this respect, the numerically controlled machine tool receives instructions from computerized data based on complex calculations that take into account the design of the part being produced and the cutting tool being employed. This has proven to be a successful and cost saving development. However, the initial capital expenditure for the manufacturing equipment is relatively high, especially when employed for short production runs where the average cost per part becomes quite prohibitive.

Since the molds are primarily produced from solid blocks of material, a considerable amount of time is spent cutting away or removing the scrap portion from each mold member, which on occasion can be significant. Efforts to reduce this cutting time has further led to the development of laminated molds. The mold, or tool, instead of being fabricated from a solid block of material, is constructed of a plurality of planar laminations. The laminations are individually cut or machined to a predetermined contour and stacked in the proper sequence to form the desired mold. As the contour is cut from the lamination the remaining portion or scrap falls away or is used in the complementary surface, requiring no further machining as is necessary when cutting a contour from a solid block. A substantial savings in time is realized in this initial cutting operation. The contours may be cut from the laminations utilizing standard machining tools or they can be cut by a laser beam or other suitable cutting means as is well known in the art.

The cutting means is aligned normal to the laminations and generally is controlled by a signal received from a computer in response to information stored in the computer in the form of x-y coordinates based on the contour being machined. After the laminations are cut and stacked in the proper sequence, they are fastened together by any suitable means to form an integral unit. Since the cutting means is displaced only along x-y coordinates, the side wall of the contour is cut normal to the planar surface of the lamination resulting in a curved profile having a stepped surface when stacked together. The stepped edges create a rough uneven surface and are smoothed out as the forming surface is machined to its final design by a suitable metal removal means, e.g., hand or machine grinding, EDM or the like.

As can readily be appreciated, the thickness of the laminations has considerable affect on the roughness of the surface. The thinner the laminations the smaller the step effect created and the less metal removal required to finish the surface. Thus, to manufacture a laminated mold requiring a minimum of finish machining after assembly, it is desirable to employ laminations as thin as practical for the contour of the mold being produced. While the final grinding or machining time is reduced to a minimum with this procedure, the use of thinner laminations results in an increase in the number of laminations utilized and therefor an increase in the time expended on the initial handling and cutting of the contours. If desired, the surface can be coated or plated after machining and assembly, i.e., by bonding, to provide the desired tolerances and surface finish.

SUMMARY OF THE INVENTION

The present invention overcomes the aforementioned shortcomings of the prior art by providing a new and improved method and apparatus for manufacturing a laminated tool having a contoured shaping surface that requires a minimum of machining. If desired, the tool, e.g. a mold, can be constructed with internal fluid passageways designed to provide efficient temperature control thereof. Alternately, or in conjunction with fluid passages, the invention may also include means for spacing select laminations to provide openings in the shaping surface that communicate with a source of air or vacuum for processes requiring venting or pressure, for example "expanded bead molding".

The novel manufacturing process employs a computer aided design system that includes software to perform the necessary calculations based on tool design and the cutting or machining means utilized, to develop a program for fabricating the tool. The invention employs a 4 or 5-axis cutting machine, which, contrary to the typical 3-axis, or x-y-z cutters, is capable of cutting along axes other than normal to the major cutting surface. In other words, the cutting means of a 4 or 5-axis cutting machine, in addition to translation in x-y-z directions, is also capable of angular displacement relative to an axis normal to the cutting surface. Thus, there is provided a cutting means with the potential for reproducing a practically unlimited variety of contours in a sheet of material, dependent primarily on the cutting tool being employed. The cutting machine is preferably numerically controlled and employs a laser beam as the cutting means due to its ability to cut rather intricate patterns in material with a minimum size kerf. Although a laser is preferred, it should be understood that other 4 or 5-axis cutting means may be utilized such as milling. EDM wire and fluid jet cutting machines, for example. The choice of cutting means is primarily determined by the complexity of the shaping surface of the tool and the material from which it is to be made.

Data pertaining to the design of the part that is to be produced by the tool is entered into the computer together with the specifications of the 4 or 5-axis cutting machine. The computer utilizes this information to develop the contour to be formed on the tool and to section the tool into a plurality of laminations having a predetermined thickness as well as a set of coordinates for programming the cutting means to cut the contours from the individual laminations. The sectioning or dividing of the tool is based on the contour of the tool shaping surface and is calculated to provide a minimum number of laminations requiring a minimum of machining to produce the finished tool surface.

As previously mentioned, the tooling, e.g. molds, are employed in various manufacturing processes, such as compression or injection molding, metal casting, vacuum forming and sheet metal stamping and can be fabricated of a variety of materials including metal, plastic and ceramic. The present invention also contemplates the use of a combination of dissimilar materials for the tool laminations to provide areas having different coefficients of heat transfer or lubricity, for example. It is therefore a primary object of the present invention to provide an improved manufacturing process for laminated tooling that includes a minimum number of laminations and a shaping surface that requires a minimum of machining and is very cost effective.

Another object of the invention is to provide such a process including the use of a multi-axis cutting machine for cutting the individual laminations.

Another object of the invention is to provide such a process including a design system that coordinates data pertaining to the shaping surface and the cutting means to calculate the preferred thickness for the laminations.

Another object of the invention is to provide an improved manufacturing process of the above character wherein the tooling includes internal fluid passageways for the temperature control thereof.

Another object of the invention is to provide an improved manufacturing process for laminated tooling wherein the shaping surface includes openings that communicate with a source of vacuum, air pressure or the atmosphere.

Still another object of the invention is to provide such a process wherein the openings are created by spacing means positioned between predetermined laminations.

Yet another object of the invention is to provide an improved manufacturing process for laminated tooling wherein the laminations are comprised of dissimilar materials.

Other objects and advantages will become more apparent during the course of the following description when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENTS

Figure 1:
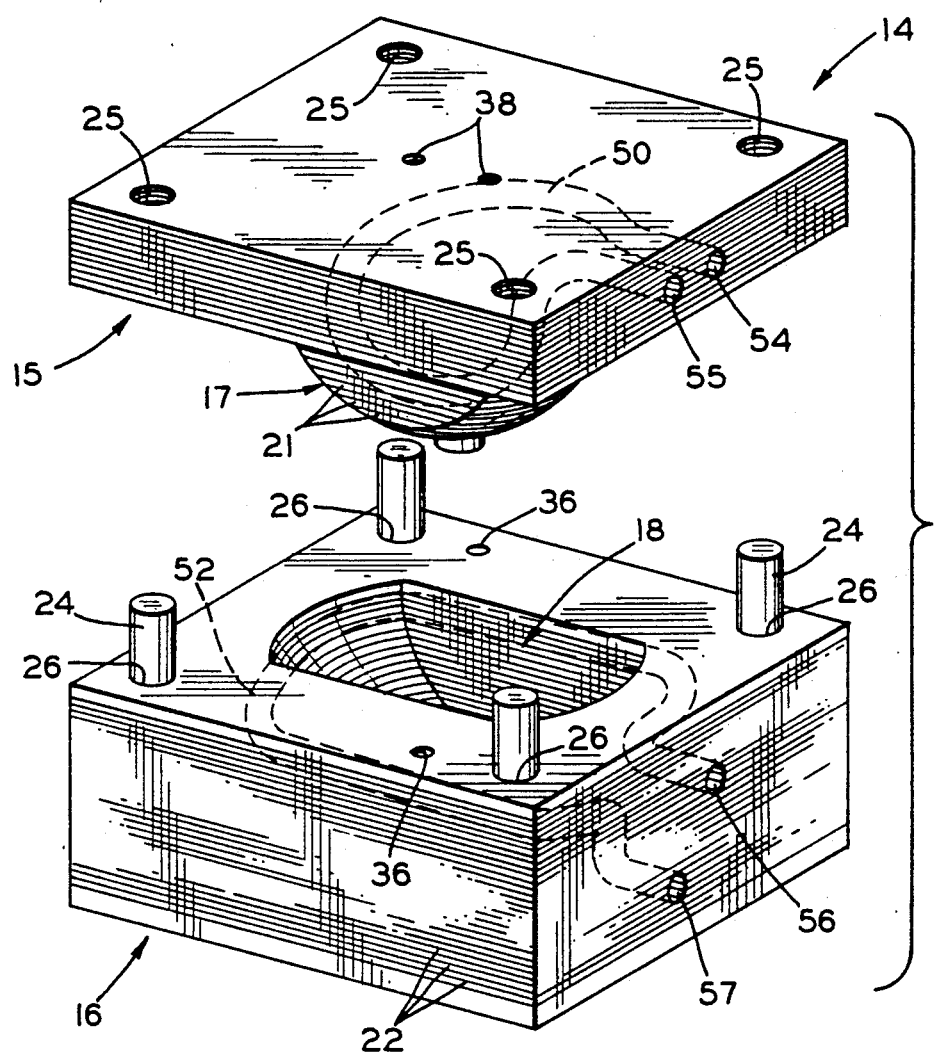
FIG. 1 is an exploded perspective view of a pair of complementary mold members made in accordance with the present invention.

Referring now to the drawings, there is illustrated in FIG. 1, a precision tool, generally designated 14, manufactured in accordance with the present invention. The tool 14 is a schematic representation of a mold that can be used in the plastic molding or metal casting industries for producing parts manufactured of glass, plastic, and ferrous and non-ferrous metals.

More particularly, the tool 14 is comprised of an upper mold member 15 and a lower mold member 16 having complementary male and female shaping or forming surfaces 17 and 18, respectively. When the mold members 15 and 16 are in the closed or operative position, the forming surfaces 17 and 18 create a cavity therebetween (not shown) representative of the part to be produced. The cavity is in communication with a supply of material under pressure by means of a sprue and gate (not shown) provided in one or both of the members 15 and 16 as is well known in the industry.

While the invention will be described primarily in connection with the manufacture of a pair of complementary mold members as depicted in the drawings, it should be understood that the manufacturing process of this invention is not restricted thereto, but also can be utilized for the manufacture of single or multiple dies for use in other processes, such as sheet metal stamping, blow molding, and thermoforming, for example.

Figure 2:
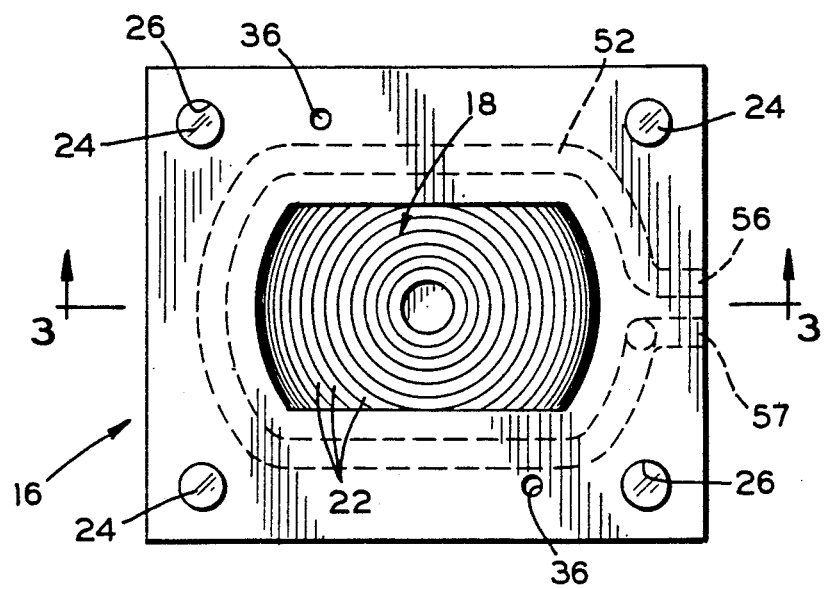
FIG. 2 is a plan view of the lower mold member illustrated in FIG. 1.
Figure 3:
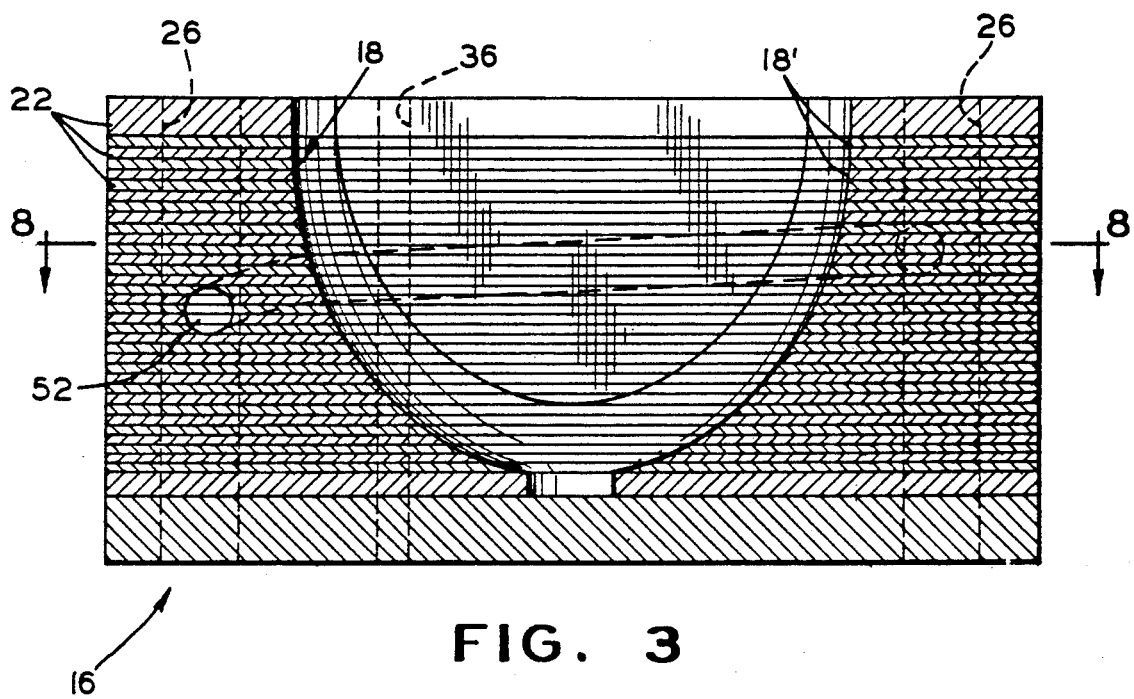
FIG. 3 is an enlarged vertical cross-sectional view of the lower mold member taken along line 3—3 of FIG. 2.

As best shown in FIGS. 1-3, the mold members 15 and 16 are comprised of a plurality of planar laminations 21 and 22, respectively, that are individually cut or machined in accordance with the invention, as will hereinafter be explained. Typically, one of the mold members includes guide rods 24 that are axially aligned with apertures 25 in the other mold member to provide proper registration of the shaping surfaces 17 and 18 in the molding process. The guide rods 24 can be attached directly to the exterior of the mold surface, or as shown in FIG. 3, they can be mounted in bores 26 formed in the body of the mold, as will be explained.

The introduction and development of the laminated molds or dies in the precision tooling industry has met with much success due especially to the substantial savings in manufacturing costs attributed primarily to reduction in capital expenditure and total machining time. As previously mentioned, prior to the advent of laminated tooling, precision tools were machined from solid blocks of material with specialized tools by highly skilled artisans, or tool makers, and more recently by numerically controlled machine tools. Much time is expended machining or cutting away the waste material from the shaping surface whether performed manually by the skilled tool maker or automatically by the numerically controlled machine. This machining time is greatly reduced when manufacturing laminated tooling. Thus, instead of spending considerable time and effort cutting away the waste portion from a solid block of material, the waste portion simply falls free and/or can be used as the complementary tool half. The laminations are machined individually by the tool maker or a numerically controlled machine much the same as the solid blocks of the prior art. It has been found advantageous to use the programmable numerically controlled machine tools when feasible, due to the consistency and reliability attributed thereto. As previously discussed, the numerically controlled machine moves a cutting tool disposed normal to the surface of the lamination in a prescribed pattern based on the contour being machined. The laminations are individually cut and stacked in their proper sequence to form the tool. Since the cutting tool is aligned normal to the surface of the lamination the machined edge of the contour is perpendicular to the surface and subsequent stacking of the laminations will generally result in a shaping surface having a stepped profile requiring additional machining to smoothen the surface and obtain the desired final contour. The thicker the laminations, the more pronounced the stepped profile and likewise the more machining necessary for smoothing the surface. It has been suggested to maintain the laminations at a minimum thickness to reduce the finishing time and, although it is successful at reducing this time, the increase in number of laminations results in an increase in the initial contour cutting time.

The present invention has reduced total machining time considerably by providing a method for cutting the individual laminations with a 4 or 5-axis cutting machine instead of the 3-axis, or x-y-z machine typically used for this purpose. The 4 or 5-axis cutter is capable of cutting at an axis other than normal to the major cutting surface resulting in a contour of practically unlimited angular profile. As will hereinafter be explained, this results in the use of thicker laminations than would otherwise be acceptable without an appreciable increase in machining The 4 or 5-axis cutting machine employed preferably is a programmable multi-axis machine tool and the cutting means preferably a laser beam.

Figure 4:
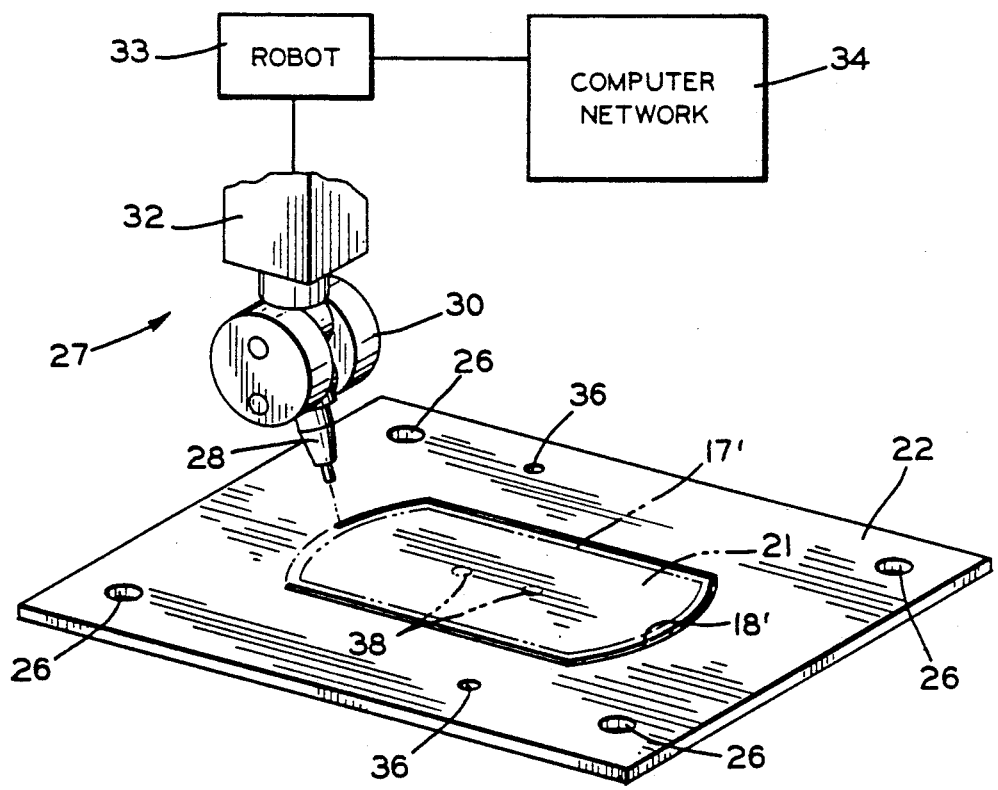
FIG. 4 is a schematic perspective view of one of the laminations being cut by a 5-axis cutting machine in accordance with the present invention.

Thus, there is illustrated schematically in FIG. 4, a 5-axis cutting machine 27 including a laser unit 28 attached to a universal-type head 30 operatively associated with the distal end of the arm 32 of a programmable multi-axis machine tool or robot 33 well known in the industry. Translation of the arm 32 along x-y coordinates as well as the angular disposition of the laser unit 28 through manipulation of head 30 is controlled by instructional signals received from a computer network 34. The signals are generated by means of a program developed by the CAD/CAM 34 based on data concerning the part to be produced and the machining or cutting means employed.

Data pertaining to the design of the part together with the pertinent specifications or limitations of the 5-axis cutting machine 27 are entered and stored into a state-of-the-art CAD/CAM system, which is a part of the network 34. The computer uses this information to design the tools for producing the part and to determine the ideal thickness for the laminations to manufacture the tooling as well as a program for cutting the laminations and stacking them in the proper sequence. The thickness of the laminations is determined to provide the least amount of machining based on the contour being cut and the cutting means employed. The laminations can all be of the same thickness, or, as best illustrated in FIG. 3, can be of different thicknesses if desired to suit the tooling being constructed. Generally, the thickness of the laminations is conveniently selected from readily available standard size stock on the order of 0.062 to 0.500 inch (1.57–12.70 mm). However, any thickness may be employed.

Referring back to FIG. 4, the 5-axis cutting machine 27 is illustrated cutting a contour 18' in one of the laminations 22 of the lower mold member 16. The lamination 22 is securely positioned with respect to the cutting machine 27 to preclude the possibility of displacement of the lamination 22 during the cutting process to insure accuracy of the cuts. Each lamination 22 includes a predetermined contour 18' that when stacked together in the proper sequence develops the forming surface 18. The laminations 22 can be pre-cut sheets of a predetermined size as shown, or they may be cut to size from larger sheets in the cutting process. If not pre-cut, the cutting of the perimeter of the laminations is simply included in the overall program and attended to when cutting the individual contours.

The laminations 22 may be provided with locating holes 36 to assist in proper registration of the individual laminations 22 when stacking for bonding purposes. The holes 36 are located with respect to the forming surface 18 and so disposed in each lamination 22 that when axially aligned by means of a locating pin (not shown) the laminations 22 are properly registered for bonding into an integral unit. Although this method has proven very satisfactory other registration means may be employed without departing from the spirit of the invention.

The laminations 22 are bonded together after stacking by any well known means such as, adhesives, brazing or welding and mechanical fasteners. The bonding choice is primarily determined by the material being used for the tool and the manufacturing process in which it will be employed.

When manufacturing tooling comprising a pair of molds or dies having complementary forming surfaces such as illustrated in FIG. 1, the cutting program is designed to cut the contour for the male portion from the blank of material forming the lamination before cutting the contour in the female. Not only does this provide the most efficient use of material, it also obviates the need for repositioning and securing the material to cut the second lamination. Thus, with reference to FIG. 4, the contour 17' which represents a segment of the forming surface 17 on the upper male mold member 15 is cut prior to the cutting of the contour 18'. Locating holes 38 for pins if desired, are also formed at this time.

In operation, the laminations 22 are individually processed including the cutting of the contour 18', bores 26, holes 36, water passages 52 and perimeter if need be, and stacked in the proper sequence as determined by the CAD system. After stacking, the laminations are securely bonded together to form an integral unit. Generally, these steps are practiced in the prior art.

Figure 5:
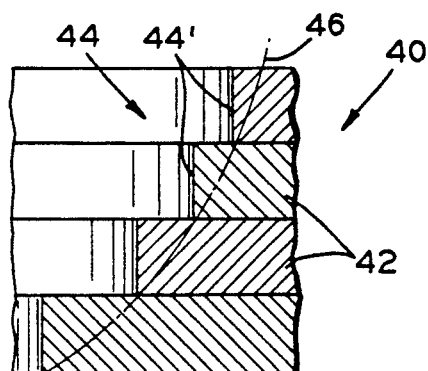
FIG. 5 is a fragmentary cross sectional view of the forming surface of a prior art laminated mold illustrating the stepped wall created by a typical x-y cutting machine.

However, in accordance with the present invention an appreciable reduction in machining time is realized by the use of a 4 or 5-axis cutting machine in place of the typical 3-axis machine currently used. To best illustrate this difference, there is shown in FIG. 5 a cross-section of a segment of a prior art mold 40 consisting of a plurality of laminations 42 and including a cavity or forming surface 44 similar to forming surface 18 on mold 16. Each lamination 42 is provided with a contour 44' formed by a conventional 3-axis, or x-y-z cutting machine and stacked in the proper sequence based on data pertaining to the forming surface 44. Phantom line 46 denotes the finished contour desired in the forming surface 44. Since the cutting machine has limited axial displacement as previously discussed, the side walls of the contours 44' are disposed normal to the major surfaces of the laminations 42. The cutting program is designed so that the contour 44' of each lamination 42 extends inwardly as depicted in the drawings, of the finished contour 46 to a degree to insure that sufficient material exists to achieve the desired results. This produces a stepped profile the severity of which is determined by the forming surface contour. The more severe or pronounced these steps, the more machining necessary to achieve the finished contour.

Figure 6:
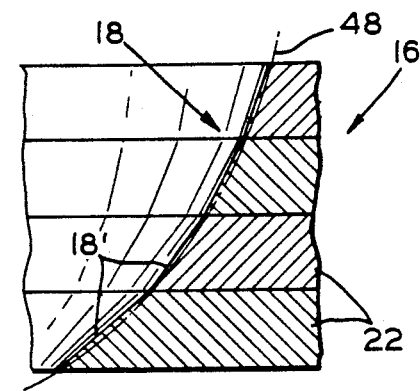
FIG. 6 is a fragmentary cross-sectional view of the laminated mold of the invention, illustrating the forming surface as cut by a 5-axis cutting machine.

The present invention substantially eliminates the stepped profile and reduces the finished machining to a minimum. Thus, there is illustrated in FIG. 6 a cross-section of a segment of the lower mold member 16 of the present invention consisting of laminations 22 and forming surface 18. Phantom line 48 represents the finished contour on the forming surface 18. The laminations 22 include contours 18' formed by the 5-axis cutting machine 27 of the invention. Due to the use of the 5-axis cutting machine, the walls of the contours 18' unlike the walls 44' of the prior art, may be cut at an infinite variety of angles with respect to the major surfaces of the laminations. This allows the program to select an angle more closely representative of the finished contour 48 substantially eliminating the stepped profile of the prior art resulting in a significant reduction in the final machining. The above results clearly manifest themselves when considered in light of FIGS. 5 and 6.

As previously mentioned, it is often necessary to provide heating and/or cooling passageways in the body of the mold or die member to control the temperature of the mold or part being produced. This is readily accomplished by including this information in the data entered into the GAD system for initially developing the tool manufacturing program. The CAD system will design efficient internal passageways most compatible for the tool being manufactured and a program for the cutting or machining of these passageways simultaneous with the cutting of the contours.

As best shown in FIGS. 1-3, the upper mold member 15 and the lower mold member 16 are provided with internal passageways 50 and 52, respectively. The passageway 50 follows a generally helical path closely spaced to the walls of the forming surface 17 for the efficient heat transfer thereof and terminates in a pair of openings 54 and 55 in the side of the mold member 15. The openings 54 and 55 provide an inlet and outlet for the circulation of the heat transfer fluid being employed. Likewise, the passageway 52 of the lower mold member 16 follows a generally helical path closely spaced and parallel to the walls of the shaping surface 18. The ends of the passageway 52 terminate at openings 56 and 57 which provide the inlet and outlet for the heat transfer fluid.

Since the passageways 50 and 52 are cut by the 5-axis laser cutting machine of the invention, they are able to follow an infinite variety of paths, straight or curved, unlike the passageways of the prior art which are limited to straight and intersecting passageways formed by conventional drilling or boring means. Thus, in accordance with the invention, fluid passageways can be located to provide the most efficient heating and cooling of the tool or part being produced without the above restrictions of the prior art.

Figure 8:
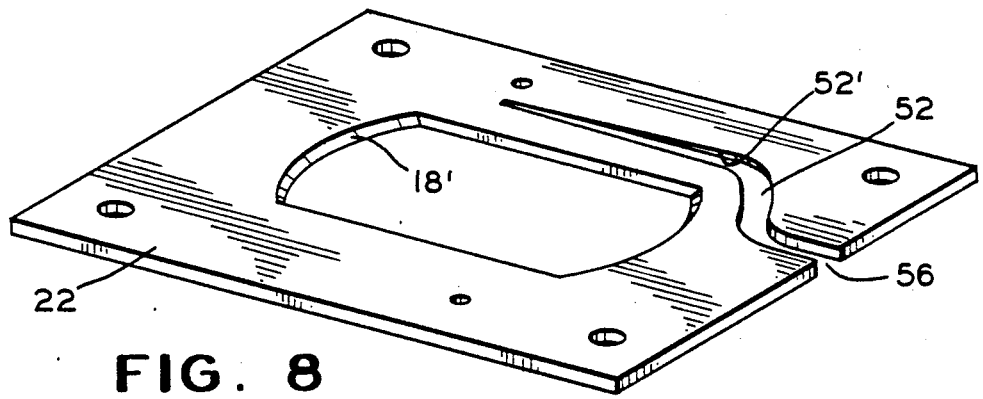
FIG. 8 is a perspective view of one of the planar laminations of the lower mold of the present invention taken along line 8—8 of FIG. 3.
Figure 7:
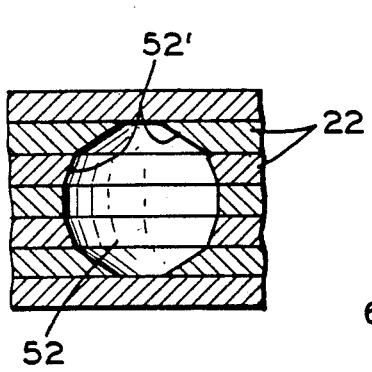
FIG. 7 is an enlarged vertical section view of the internal fluid passageway of FIG. 3.

As shown in FIGS. 7 and 8, the fluid passageway 52 is formed by contours 52' cut in the laminations 22. The passageway can be formed free of any interruptions as illustrated in FIG. 7 for unimpeded fluid flow, or it can be formed with interruptions such as steps, to intentionally agitate the fluid as it is forced through the passageway.

In FIG. 8 there is represented one of the laminations 22 having a contour 52' following a path adjacent the forming surface contour 18'. The contour 52' of this particular lamination starts at the edge thereof with the walls substantially normal to the major surfaces of the lamination forming a segment of the sidewalls of the passageway 52 at opening 56. As the contour proceeds into the lamination the walls of the contour 52' are progressively converging with respect to the upper surface of the lamination 22 forming a gradually increasing upper segment of passageway 52. This configuration represents the downward incline of the passageway 52 at this location on the mold 16.

Figure 9:
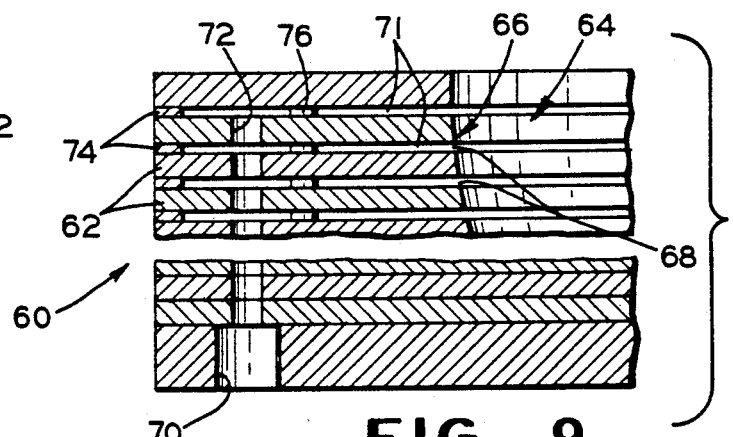
FIG. 9 is a fragmentary cross-sectional view of an alternate embodiment of the present invention illustrating the laminations in a spaced relationship.

There is shown in FIG. 9 a segment of a laminated vented tool generally indicated at 60, manufactured in accordance with the invention. Vacuum molds, core boxes, blow molds and injection molds can be manufactured having either male or female shaping surfaces and may include an opposing mold having a complementary shaping surface to assist in the forming process, if desired. The vented tool 60 is comprised of a plurality of laminations 62 and includes a cavity 64 having a shaping surface 66. The laminations are designed and cut in the same manner as described in the first embodiment.

Figure 10:
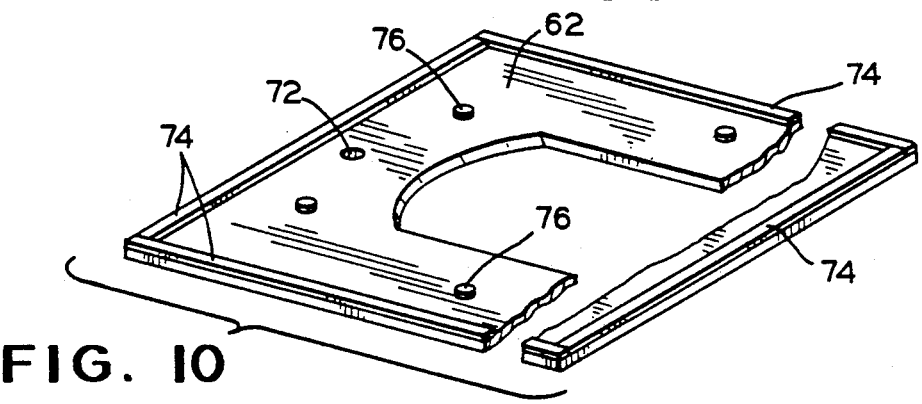
FIG. 10 is a fragmentary perspective view of one of the laminations of FIG. 9 including the means for spacing the laminations.

The shaping surface 66 is provided with a plurality of narrow slit-like openings 68 in communication with a bore 70 by means of chambers 71 and apertures 72. The bore 70 is adapted for connection to a source of vacuum, air pressure or atmosphere (not shown). The slit-like openings 68 completely surround the cavity 64 at each location and are created by providing spacing means between adjacent laminations 62. The spacing means with reference to FIG. 10, include elongated strips 74 fixed to the perimeter of the lamination 62 and spacer elements 76 disposed intermediate the shaping surface 66 and strips 74. The strips 74 form the outer walls of the chambers 71 and provide a hermetic seal between adjacent lamination when bonded into an integral unit. The elements 76 are furnished to maintain the proper spacing between the laminations 62 and may not be required in all circumstances. The strips 74 are illustrated as relatively narrow in width with respect to the length however, they may be considerably wider if desired, which would eliminate the need for intermediate spacers.

The number and location of the slit-like openings 68 is determined by a number of factors among which is the complexity or contour of the shaping surface 66. The spacing of the laminations 62, i.e., the size or height of the slit-like openings 68 as viewed in FIG. 9, is determined by the molding or manufacturing process being employed, the viscosity of the material, e.g., the plastic, being cast or injected, etc., and is generally on the order of 0.001–0.015 inch (0.025–0.381 mm) but not restricted thereto.

Spacing the laminations as above described to create openings in a shaping surface can also be employed in the manufacture of blow molds or as a means for venting tooling when necessary. A laminated mold or die manufactured in accordance with the present invention is generally assembled from laminations of similar material. However, occasionally it has been found desirable to combine dissimilar materials based on properties such as lubricity and heat transfer to better suit a mold or die to a particular situation. Materials having different coefficients of heat transfer, for example, can be combined to control the heating and cooling rate on predetermined portions of the mold.

A plastic material having a low coefficient of friction, e.g., Teflon ®, could be combined with a durable metal to manufacture long lasting tooling having select areas of high lubricity. This is especially useful in sheet metal drawing processes to reduce friction between the mold and sheet metal in critical areas. High wear areas such as these may readily be replaced as the need arises to further prolong the life of the tooling.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. A method for the manufacture of a tool for producing a contoured part, comprising:
   defining the contour of the part;
   designing a graphic of said tool with a surface corresponding to said defined contour;
   sectioning said graphic into a plurality of planar laminations each having a predetermined thickness;
   developing a program for a 4 or 5-axis cutting machine for cutting a plurality of individual segments corresponding to said plurality of planar laminations from sheet material having said predetermined thicknesses;
   providing sheet material having said predetermined thicknesses;
   providing a 4 or 5-axis cutting machine;
   securing said sheet material in a predetermined stationary position;
   cutting said plurality of individual segments from said sheet material, while said sheet material remains stationary, with said 4 or 5-axis cutting machine according to said program;
   assembling said plurality of individual segments into a stack in a preselected sequence corresponding to said graphic; and
   providing means for securing said individual segments into an integral unit to form said tool.

2. A method as defined in claim 1, wherein said sheet material is metal.

3. A method as defined in claim 1, wherein the composition of said sheet material and individual segments cut therefrom varies throughout the thickness dimension of said tool.

4. A method as defined in claim 1, wherein the thickness of at least one of said individual segments is not equal to the thickness of the remaining segments of said stack.

5. A method as defined in claim 1, wherein each of said individual segments has a thickness in the range of from 0.062 inch to 0.500 inch (1.57–12.70 mm).

6. A method for the manufacture of a mold for producing a contoured part, comprising:
   defining the contour of the part;
   designing a graphic of said mold with a cavity shaping surface corresponding to said defined contour;
   sectioning said graphic into a plurality of planar laminations each having a predetermined thickness;
   developing a program for a cutting machine for cutting a plurality of individual segments corresponding to said plurality of planar laminations from sheet material having said predetermined thicknesses;
   providing sheet material having said predetermined thicknesses;
   providing a cutting machine;
   cutting said plurality of individual segments from said sheet material with said cutting machine according to said program;
   assembling said plurality of individual segments into a stack in a preselected sequence corresponding to said graphic;
   inserting between selected ones of said individual segments spacing means, inside the periphery of said individual segments, to provide communications between the mold cavity and a source of vacuum, air under pressure, or the atmosphere; and
   providing means for securing said individual laminations and spacing means into an integral unit to form said mold.

7. A method as defined in claim 6, wherein said sheet material is metal.

8. A method as defined in claim 6, wherein the composition of said sheet material and individual segments cut therefrom varies throughout the thickness dimension of said mold.

9. A method as defined in claim 6, wherein said spacing means includes elongated strips fixed adjacent the perimeter of said selected ones of the said individual segments.

10. A method as defined in claim 6, wherein said spacing means provide separations between the selected ones of said segments in the order of about 0.001 inch to 0.015 inch (0.025–0.381 mm).

11. A method for the manufacture of a tool for producing a contoured part, comprising:
defining the contour of the part;
designing a graphic of said tool with a surface corresponding to said defined contour and internal passageways for the circulation of heating or cooling fluids adjacent said surface;
sectioning said graphic into a plurality of planar laminations each having a predetermined thickness and cut-out(s) to provide said surface and said passageways;
developing a program for a cutting machine for cutting a plurality of individual segments corresponding to said plurality of planar laminations from sheet material having said predetermined thicknesses;
providing sheet material having said predetermined thicknesses;
cutting said plurality of individual segments from said sheet material according to said program;
assembling said plurality of individual segments into a stack in a preselected sequence corresponding to said graphic such that said internal passageways for the circulation of heating or cooling fluids adjacent said surface are created; and
providing means for securing said individual laminations into an integral unit to form said tool.

12. A method as defined in claim 11, wherein said cutting of said segments to provide said cut-out(s) is performed by a 4 or 5-axis cutting means.

13. A method as defined in claim 11, wherein said sheet material is metal.

14. A method as defined in claim 11, wherein the composition of said sheet material and individual segments cut therefrom varies throughout the thickness dimension of said tool.

15. A method for the manufacture of a tool for producing a contoured part, comprising:
providing a computer aided design system;
entering design data of the contoured part into said system for generating a three-dimensional graphic thereof;
instructing said system to develop a graphic representation of said tool having a contoured shaping surface corresponding to the three-dimensional graphic of the contoured part and to divide the developed graphic representation of said tool into a plurality of planar laminations having a predetermined thickness;
providing a program for a 4 or 5-axis cutting means for cutting a plurality of individual segments in a predetermined sequence corresponding to said planar laminations from sheet material of a predetermined thickness;
providing sheet material for the individual segments;
securing said sheet material in a predetermined stationary position;
providing a 4 or 5-axis cutting means;
cutting the individual segments from said sheet material, while said sheet material remains stationary, with said 4 or 5-axis cutting means and assembling said individual segments in the pre-selected sequence into a stack corresponding to said developed graphic representation of said tool; and
bonding the individual laminations into an integral unit to form said tool.

16. A tool produced by the process of claim 1.
17. A tool produced by the process of claim 6.
18. A tool produced by the process of claim 11.
19. A tool produced by the process of claim 15.

20. A method for the manufacture of a tool for producing a contoured part, comprising:
defining the contour of the part;
designing a graphic of said tool with a surface corresponding to said defined contour;
sectioning said graphic into a plurality of planar laminations each having a predetermined thickness;
developing a program for a 4 or 5-axis cutting machine for cutting a plurality of individual segments corresponding to said plurality of planar laminations from sheet material having said predetermined thicknesses;
providing sheet materials of differing compositions having said predetermined thicknesses;
cutting said plurality of individual segments from said sheet materials with said 4 or 5-axis cutting machine according to said program;
assembling said plurality of individual segments into a stack in a predetermined sequence corresponding to said graphic such that the composition of said sheet material and individual segments cut therefrom varies throughout the thickness dimension of said tool; and
providing means for securing said individual segments into an integral unit to form said tool.

* * * * *